United States Patent
Shiga et al.

(10) Patent No.: US 6,917,475 B2
(45) Date of Patent: Jul. 12, 2005

(54) OPTICAL ELEMENT

(75) Inventors: Naohito Shiga, Hachioji (JP); Kunihisa Obi, Hachioji (JP); Atsushi Goto, Oume (JP); Tetsuhide Takeyama, Hachioji (JP); Michio Shirai, Kodaira (JP)

(73) Assignee: Olympus Corporation, Tokyo (JP)

( * ) Notice: Subject to any disclaimer, the term of this patent is extended or adjusted under 35 U.S.C. 154(b) by 39 days.

(21) Appl. No.: 10/462,604

(22) Filed: Jun. 17, 2003

(65) Prior Publication Data

US 2003/0231403 A1 Dec. 18, 2003

(30) Foreign Application Priority Data

Jun. 17, 2002 (JP) ........................................ 2002-175568

(51) Int. Cl.⁷ ............................................... G02B 11/00
(52) U.S. Cl. ..................... 359/642; 359/831; 359/885
(58) Field of Search ................................ 359/642, 831, 359/885; 264/1.32, 2.1–2.7, 173, 13; 526/242, 255; 570/123, 161–162; 501/40; 987/32; 65/448; 558/464; 528/10

(56) References Cited

U.S. PATENT DOCUMENTS 4,948,854 A * 8/1990 Amaya et al. .............. 526/261

2002/0006558 A1 * 1/2002 Kobayashi et al. ............ 430/7
2003/0077437 A1 * 4/2003 Nakamura et al. .......... 428/327
2003/0134209 A1 * 7/2003 Itami ......................... 430/58.2

FOREIGN PATENT DOCUMENTS

| JP | 64-083537 | 3/1989 |
| JP | 06-032631 | 2/1994 |
| JP | 06-127972 | 5/1994 |
| JP | 06-316433 | 11/1994 |

* cited by examiner

Primary Examiner—Jordan M. Schwartz
(74) Attorney, Agent, or Firm—Pillsbury Winthrop LLP

(57) ABSTRACT

The invention provides an optical element that has a low refractive-index chromatic dispersion, a high degree of freedom in molding or forming as is the case with synthetic resins, and moldability or formability that lends itself to mass production. The optical element is obtained by molding or otherwise forming a composition containing a first material that is a fine particle having an Abbe number vd of 80 or greater indicative of a chromatic dispersion in a visible range and having a size of less than 400 nm, and a second material that is an organic/inorganic hybrid material comprising an organic polymer material having a carbon-carbon bond in a main chain and an inorganic component.

7 Claims, 3 Drawing Sheets

(A)

(B)

(C)

OPTICAL ELEMENT

BACKGROUND OF THE INVENTION

The present invention relates generally to an optical element obtained by configuring a material having satisfactory optical properties represented by refractive-index chromatic dispersion characteristics by molding or forming means into a given shape, for instance, lenses, prisms, filters, refracting optical elements and diffracting optical elements.

So far, chromatic aberrations of dioptric systems have been corrected by combinations of optical materials having varying refractive-index dispersion characteristics. By making a selection from many optical materials having varying refractive indices and varying refractive-index chromatic dispersion characteristics for optical designs, the degree of freedom in the optical designs is so enhanced that chromatic aberration-free, high-precision optical systems can easily be designed.

For such optical materials, there have been developed a variety of optical glasses having varying refractive indices and varying chromatic dispersion characteristics.

FIG. 1 is illustrative of the refractive index vs. chromatic dispersion relations in optical glasses and optical resins used so far as optical materials.

Some available optical glasses have a refractive index of about 1.43 to 2 and an Abbe number vd of about 20 to 95 indicative of refracting-index chromatic dispersion characteristics. On the other hand, synthetic resins that may be used as optical materials are limited in terms of type and narrower than optical glasses in terms of the range of the optical properties to be selected, as shown in FIG. 1, and so optical designs using synthetic resins have many restrictions.

To reduce the weight of taking optical systems such as cameras and improve their performance, optical elements having optically effective surfaces in an aspheric or free-form surface form rather than in a conventional spherical form have now been used. The use of aspheric optical elements is found to make some contributions to performance improvements through reductions in the number of lenses used and removal of spherical aberrations. With cutting and polishing that is a typical method for processing conventional optical elements such as glass lenses, however, it is very difficult to configure aspheric forms, and so this method does not lend itself to mass production. For that reason, as known from JP-A 6-32631, aspheric or other surfaces outside of spherical ones have been processed using molds having a precisely mirror-finished molding surface; optical glasses have been processed by precise press molding and synthetic resins by injection molding, cast molding or the like. Even in those cases, optical materials having a low dispersion, i.e., a large Abbe number vd indicative of low chromatic dispersion characteristics in the visible range must be used for correction of chromatic aberrations in view of optical designs. Thus, optical glasses having a variety of low refractive-index chromatic dispersions have been developed, as known typically from JP-B 4-33740 and JP-A 7-172864.

However, current commercial optical glasses having low refracting-index chromatic dispersions, because of being based on fluorophosphates, cause damage to the precisely processed molding surface of a mold under the influences of glass components when they are subjected to precise press molding at a high temperature at which they soften, making it difficult to maintain the surface precision of the molding surface of the mold. Thus, mass-production of high-quality optical glasses is still difficult.

With the aforesaid fluorophosphate glass, the radius of curvature of the optically effective surface of an optical element must be diminished in view of optical design because its refractive index is low. This causes the thickness deviation to become considerably large, resulting in an increase in the level of difficulty in molding processes. For instance, precise press molding for glasses has a possibility of glass cracking upon drastic deformation given to the softening glass via the molding surface of the mold, and so renders it very difficult to mold and process lenses having too large a thickness deviation.

By contrast, synthetic resins, because of being improved in moldability or formability, and capable of configuring lenses having a large thickness deviation by injection molding or cast molding, facilitate fabrication of lenses, etc. As shown in FIG. 1, however, the synthetic resins are not only narrow in the range of optical properties but also provide an optical element that is poor in environmental stability due to a high rate of thermal expansion and hygroscopic deformation depending on composition. Thus, the synthetic resins have a problem in that they are unsuitable for mass production.

It is therefore an object of the present invention to provide an optical element capable of maintaining high performance, for example, a lens, which is obtained by molding or otherwise forming an optical material that has optical properties in a low chromatic dispersion range extending the range of optical properties, a high degree of freedom in molding or forming as is the case with synthetic resins and moldability or formability suited for mass production, and is superior in environmental stability to synthetic resins used so far in optical applications.

SUMMARY OF THE INVENTION

The present invention provides an optical element, which has been obtained by molding or otherwise forming a composition containing a first material that is a fine particle having an Abbe number vd of 80 or greater indicative of a chromatic dispersion in a visible range and having a size of less than 400 nm, and a second material that is an organic/inorganic hybrid material comprising an organic polymer material having a carbon-carbon bond in a main chain and an inorganic component.

Preferably, the first material is a fluoride.

Preferably, the organic polymer material that forms a part of the second material contains a noncrystalline fluororesin.

Preferably, the inorganic component in the second material contains silicon.

DESCRIPTION OF THE PREFERRED EMBODIMENT

The present invention is characterized by use of a composition that contains an organic/inorganic hybrid material comprising an organic polymer material and an inorganic component and a fine particle having desired optical properties.

The organic/inorganic hybrid material is a hybrid material in which the finely divided inorganic component is homogeneously dispersed in, and combined with, the organic component. More exactly, the inorganic component is dispersed in the organic component to such a degree that they are intermingled and combined together at a molecular or nano-scale level. In that organic/inorganic hybrid material, both the components interact to impart thereto the properties that are not found in a composition comprising a simple dispersion of inorganic particles in an organic polymer.

In consideration of the defects of a conventional optical element using optical glasses and optical resins, the inventors have made extensive studies and investigations. As a result, the inventors have now found that a low-dispersion material comprising a moldable or otherwise formable composition allowed to have desired dispersion characteristics by regulating optical properties using the organic/inorganic hybrid material in which the organic component is combined with the inorganic component and the first material showing the desired refractive-index chromatic dispersion characteristics can be molded or otherwise formed into an optical element.

Figure 2:
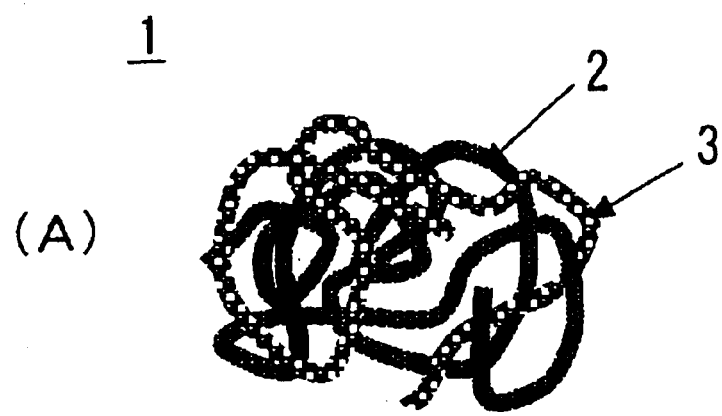
FIGS. 2(A), 2(B) and 2(C) are illustrative of organic/inorganic hybrid materials.
Figure 2:
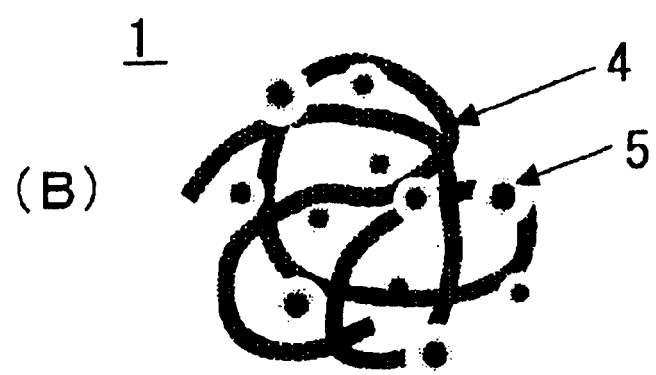
Figure 2:
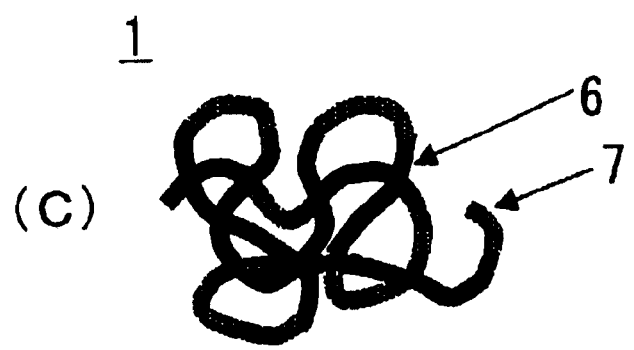

FIGS. 2(A), 2(B) and 2(C) are illustrative of specific organic/inorganic hybrid materials according to the present invention. A organic/inorganic hybrid material 1 is broken down into three types, the IPN (interpenetrating polymer network) type (FIG. 2(A)) wherein an inorganic component chain 3 formed by the sol-gel reaction of a metal alkoxide in the presence of an organic polymer chain 2 is entangled with the organic polymer chain 2 so that both the chains 2 and 3 are interpenetrated in the resulting chain matrices, the composite structure type (FIG. 2(B)) wherein inorganic fine particles 5 at a nano-scale level are dispersed in an organic polymer component 4, and the copolymer type (FIG. 2(C)) wherein a monomer or oligomer of an organic component 6 is copolymerized with an inorganic element-containing monomer or oligomer that forms an inorganic component 7. Also, a hybrid material comprising two or more such types may be used.

The IPN type organic/inorganic hybrid material and the composite type organic/inorganic hybrid material are now explained in detail.

As the organic polymer for the IPN type organic/inorganic hybrid material, a chainlike or crosslinked polymer substance having an organic skeleton that mainly comprises a carbon-carbon bond in its main chain is used. That organic polymer, for instance, includes methyl methacrylate resin, polyolefin resin, poly-styrene resin, norbornene resin, polycarbonate resin, acrylonitrile-butadiene-styrene copolymer resin, polyamide resin, polyester resin, vinyl chloride resin and thermoplastic resins comprising copolymers of these resins as well as epoxy resin, unsaturated ester resin, acrylate resin, urethane resin, polyimide resin, phenol resin, fluororesin, aryl resin, polyether resin, silicone resin and thermosetting resins such as resins obtained by modifying a part of these functional groups.

The inorganic component, for instance, includes an inorganic polymer having a metalloxane skeleton, which is obtained by the sol-gel reaction of an organometallic compound selected from metal alkoxides, metal acetylacetonates and metal carboxylates containing an element such as Si, Ti, Zr, Al, Ba, Ta, Ge, Ga, Cu, Sc, Bi and lanthanide, and an inorganic polymer having in its skeleton a metal element such as Zn, Sn, In, Ge, and Pb. These inorganic polymers may have sulfur, boron, selenium, tellurium or the like in their molecular chains.

As the organic polymer component for the organic/inorganic hybrid material of the composite structure type, use is made of the thermoplastic resins and thermosetting resins mentioned in conjunction with the IPN type organic/inorganic hybrid material. The inorganic component, for instance, includes metal oxides, metal sulfides, metal nitrides, metal carbides, metal halides or metals, which are in a finely divided form having a size of 100 nm or less and preferably of the order of several tens of nanometers, much smaller than the wavelength of visible light. By way of example but not by way of limitation, the metal element contained in the inorganic component includes Si, Ti, Zr, Al, Ba, Ta, Ge, lanthanide, Zn, Sn, In, Y, Ni, Co, Cr, Au, Ag, Cu, Ca, Mg, Sc, and W. More specifically, fine particles of silicon oxide, titanium oxide, zirconium oxide, aluminum oxide, zinc sulfide, barium titanate, magnesium fluoride, indium oxide, tin oxide, silicon carbide and c-BN are usable. As the inorganic component, use may also be made of inorganic fine particles obtained by the hydrolysis and condensation of metal alkoxides comprising metal elements or metal fine particles comprising pure metals, which are obtained by the reduction of inorganic fine particles or metal complexes.

For dispersibility improvements, these inorganic or metal fine particles may have been treated on their surfaces with a coupling agent or a surface active agent.

For the inorganic component that forms a part of the organic/inorganic hybrid material, especially of the IPN structure type, it is preferable to use hydrolysates of metal alkoxides containing Si, Zr, Al, and Ti as the metal component. For instance, use may be made of hydrolysates of metal alkoxides, which are obtained by stirring one or two or more of tetramethoxysilane, tetraethoxysilane, tetra-n-propoxysilane, tetraisopropoxysilane, tetra-n-butoxysilane, methyltrimethoxy-silane, methyltripropoxy-silane, methyltriacetoxysilane, methyltributoxysilane, methyltripropoxysilane, methyltriamyloxysilane, aluminum isopropoxysilane, titanium isopropoxide and zirconium isopropoxide, with the addition thereto of acids such as hydrochloric acid, sulfuric acid or acetic acid or alkalis such as sodium hydroxide, potassium hydroxide, ammonia or amines.

Figure 1:
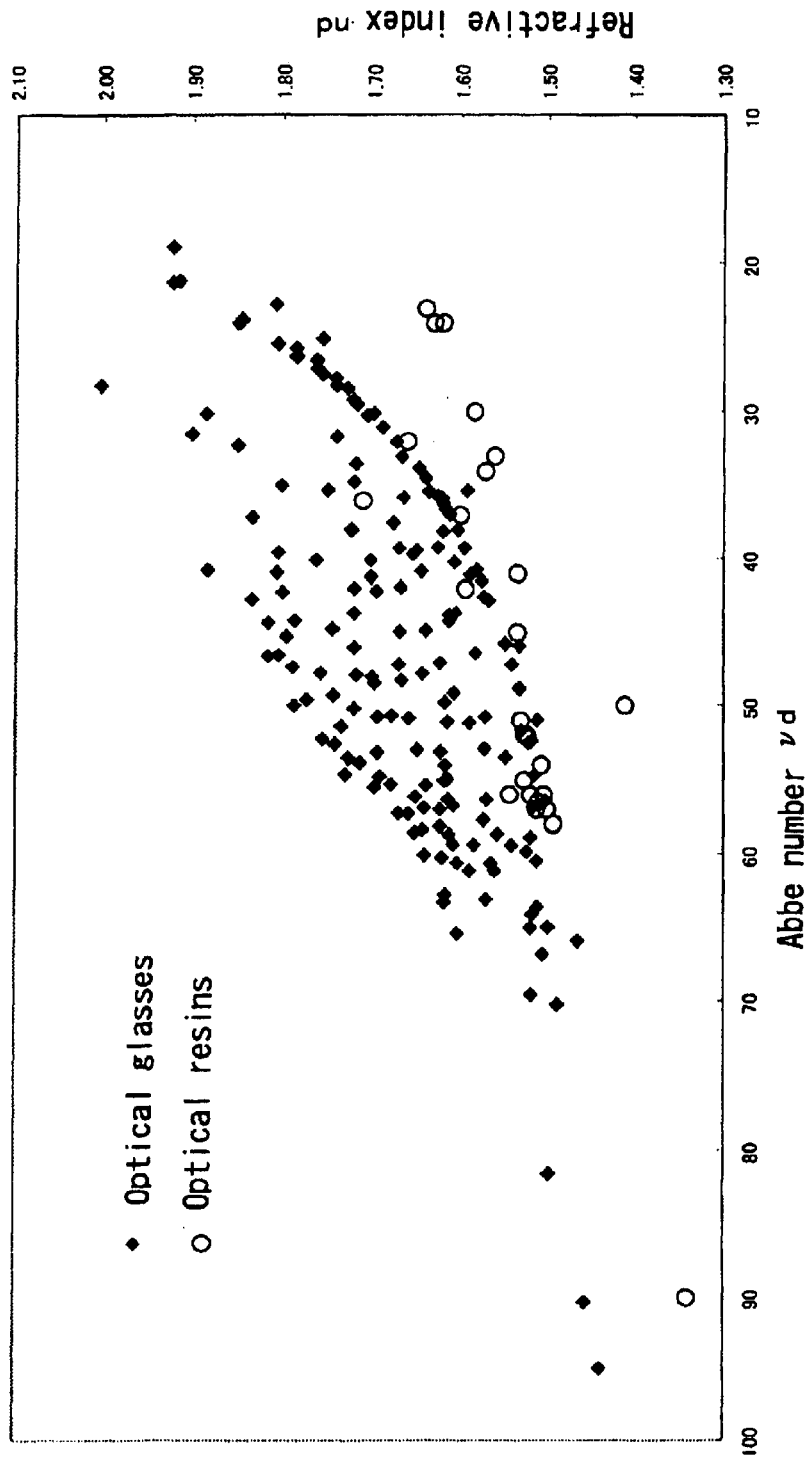
FIG. 1 is illustrative of the refractive-index, Abbe-number distribution of optical glasses and optical synthetic resins.

A substance is made up of molecules or atoms, and so its oscillator properties, density, etc. are determined by atomic or molecular structure. A distribution of a refractive index nd at d-line and an Abbe number vd indicative of chromatic dispersion in the visible light range indicates that, as shown in FIG. 1, various optical properties are obtained depending on the atomic or molecular structure of a substance.

By the way, the behavior of light waves propagating through a medium is derived from Maxwell's four differential equations for electromagnetics, and with the behavior of light waves through an inhomogeneous medium having a spatial distribution of refractive index in mind, the relation between the refractive index n and the polarizability x' of a substance is expressed by equation (1):

$$n^2 = 1 + x' \qquad (1)$$

Figure 3:
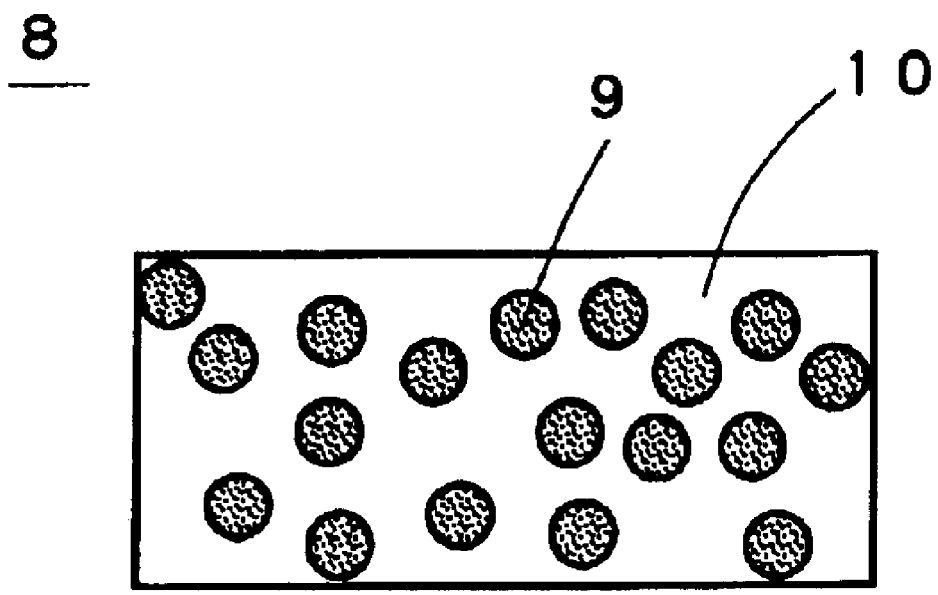
FIG. 3 is illustrative of an optical material with fine particles dispersed therein.

The optical element of the invention has such a structure as shown in FIG. 3, wherein the first material that is formed of fine particles smaller in size than the wavelength of visible light is dispersed in the second material that is the composition of the organic/inorganic hybrid material. Suppose now that the size of the fine particles that form the first material is 2 to 100 nm. The fine particles, because of having a distinct interface with respect to the organic/inorganic hybrid material, show a bulky polarization property. Referring to the polarization property of the fine particles with respect to light in the visible light range of 400 to 750 nm wavelengths, the magnitude of optical homogeneity is negligible in the case of such a structure as shown in FIG. 1. Therefore, the optical properties of such a structure as shown in FIG. 3 are described by Drude theory expressed by equation (2):

$$n^2 = 1 + x_1 = 1 + T(n_1^2 - 1) \quad (2)$$

Here $n_1$ is the refractive index of the first material, T is the content of the first material where $0 < T < 1$, n is the refractive index of the whole composition, and $x_1$ is the polarizability of the first material.

Here, the Abbe number is expressed by equation (3):

$$vd = (n_d - 1)/(n_F - n_c) \quad (3)$$

Here $n_d$ is the refractive index of the first material at 587 nm wavelength, $n_F$ is the refractive index of the first material at 486 nm wavelength, and $n_c$ is the refractive index of the first material at 656 nm wavelength.

From equations (2) and (3) it is found that by the addition of a substance having low dispersion, i.e., a large Abbe number as the first material, the whole composition is allowed to have a low dispersion.

The substance having a low dispersion, for instance, includes fluorides such as magnesium fluoride (nd=1.377 and vd=105), calcium fluoride (nd=1.434 and vd=95) and barium fluoride (nd=1.474 and vd=82). However, these fluorides, because of being crystalline and fragile, have difficulty in obtaining an optical element form by cutting and polishing, and because of having a high melting point, have difficulty in obtaining an aspheric surface shape by precise press molding unlike glasses. According to the present invention, however, it is possible to mix fine particles having an Abbe number of 80 or greater with the organic/inorganic hybrid material, thereby obtaining a composition having a reduced dispersion. The refractive index of that mixture is then given by equation (4):

$$n^2 = 1 + Tx_1 + (1-T)x_2 = 1 + T(n_1^2 - 1) + (1-T)(n_2^2 - 1) \quad (4)$$

Here $n_1$ is the refractive index of the first material, $n_2$ is the refractive index of the organic/inorganic hybrid material, T is the content of the first material where $0 < T < 1$, and $x_2$ is the polarizability of the organic/inorganic hybrid material.

No particular limitation is imposed on how to mix the first material in the fine particle form with the organic/inorganic hybrid material provided that the fine particles can be dispersed in the organic/inorganic hybrid material at a size that is much smaller than 400 nm, i.e., the wavelength of the visible light range and contributes little to scattering of light.

The size of fine particles where light scatters varies depending on how much light is absorbed in them. Accordingly, the size of fine particles is preferably in the range of 2 to 100 nm for the optical element to be used in a visible light wavelength range of 400 to 750 nm, and in the range of 2 to 400 nm for the optical element to be used in an infrared light wavelength range of about 800 to 1,600 nm, because scattering of light can be prevented with fine particles of 2 to 400 nm in size.

The synthetic resin material that shows a low dispersion, for instance, includes a noncrystalline fluororesin (vd≈90) that is mechanically soft (with a durometer hardness of the order of D45 to D80) and has a coefficient of linear expansion of the same order of $10^{-5}$ as is the case with general synthetic resins. Thus, an optical element composed only of such a fluororesin is vulnerable to damage and susceptible to large thermal expansion, and so is poor in environmental stability.

In the present invention, even when the noncrystalline fluororesin is used as the organic polymer material of the organic/inorganic hybrid material, i.e., as the organic component, it is possible to obtain an organic/inorganic hybrid material wherein the finely divided inorganic component is homogeneously dispersed throughout the organic component to form a composite structure, thereby achieving improvements in mechanical properties and reducing a change in thermal expansion and, hence, achieving environmental stability.

The organic/inorganic hybrid material of the invention may be any one of the IPN, composite and copolymer types so long as any scattering of light is not induced. In the present invention, however, it is preferable to use the interpenetrating polymer network (IPN) type or the copolymer type organic/inorganic hybrid material, because when the composite type organic/inorganic hybrid material is used as the second material, the content thereof is often limited because of interference with the first material in the fine particle form.

To allow the optical element-forming composition to have a low refractive-index chromatic dispersion, it is desired that the organic/inorganic hybrid material, too, have a low refractive-index chromatic dispersion as can be understood from equations (3) and (4). The organic component in the material having a low refractive-index chromatic dispersion, for instance, includes copolymers containing fluororesins such as tetrafluoroethylene, hexafluoroethylene and vinylidene fluoride; copolymers containing the following fluorine-containing repeating unit (1) or (2); noncrystalline fluororesins ($n_d$=1.28 to 1.4 and vd=85 to 90) comprising copolymers of these with tetrafluoroethylene; acrylic resins ($n_d$=1.49 and vd=58); and amorphous polyolefin resins ($n_d$= 1.53 and vd=57).

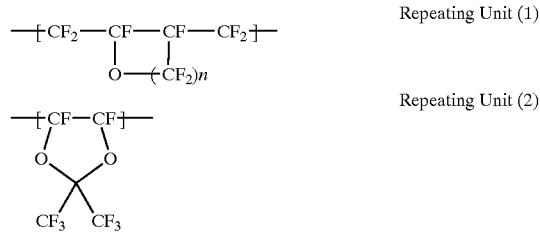

Repeating Unit (1)

Repeating Unit (2)

By combining these components with the inorganic polymer component such as silsesquioxane obtained by hydrolysis and polycondensation of an alkyltrialkoxysilane, it is possible to obtain an IPN type organic/inorganic hybrid material.

The first material having an Abbe number of 80 or greater, for instance, includes fluorides such as magnesium fluoride, calcium fluoride and barium fluoride.

By mixing and dispersing the first material in a fine particle form of 100 nm or less in size with and in the second material, i.e., the organic/inorganic hybrid material, it is possible to obtain an optical material having a low refractive-index dispersion.

Noncrystalline fluororesins, obtained by the copolymerization of tetrafluoroethylene, hexafluoropropylene, vinylidene fluoride, etc., acrylic resins, and amorphous polyolefin resins are found to have thermoplasticity, and organic/inorganic hybrid materials obtained by combining these with inorganic materials, too, have again thermoplasticity. Thus, optical materials comprising these materials may be configured into an optical element shape by the same molding methods for molding and processing synethic resins by themselves, for instance, compression molding or injection molding.

Alternatively, an optical element may be formed by hydrolyzing and polycondensing an alkyltrialkoxysilane into a gel state, and casting a polyermizable viscous fluid obtained by mixing the gel with an acrylate monomer and a radical polymerization initiator in a mold where the acrylate monomer is radically polymerized by heating or light irradiation.

The present invention is now explained specifically with reference to examples and comparative examples.

EXAMPLE 1

A fluororesin (TVH220 made by Dainion Co., Ltd. with a melting point of 110 to 130° C.) obtained by copolymerization of tetrafluoroethylene-hexafluoropropane-vinylidene fluoride soluble in solvents based on lower ketones or esters was dissolved as the organic component in methyl ethyl ketone to prepare a solution having a 10% by mass concentration.

A solution (55.8 parts by weight) wherein methyltrimethoxysilane and methacryloyloxypropyltrimethoxysilane were mixed together with at a molar ratio of 8:2 was dissolved in 30 parts by weight of acetone, and the solution was stirred at room temperature for 24 hours with the addition of water in an amount of 18.9 parts equivalent to the methoxy group, thereby obtaining an inorganic polymer component solution. This solution was well mixed and stirred with a solution of fluororesin in methyl ethyl ketone while the ratio of the fluororesin to the mass of the nonvolatile matter in the aforesaid solution was 1:9 (by mass), thereby preparing a homogeneous solution for the organic/inorganic hybrid material.

Then, finely divided magnesium fluoride having an average particle diameter of 50 nm (with nd=1.37 and vd=105.5) was well mixed and stirred with the homogeneous solution. The finely divided magnesium fluoride was added such that its ratio to the mass of the organic/inorganic hybrid material obtained by drying the organic/inorganic hybrid material solution was 3:7 (by mass).

The obtained solution was heated under reduced pressure in an evaporator into a concentrated, viscous fluid. This fluid was cast into a sheet-forming mold, where volatile residues were removed by heating to 40° C., thereby obtaining a transparent sheet of 4 mm in thickness.

By measurement, the refractive index and Abbe number of the transparent sheet were found to be nd=1.360 and vd=85. The surface hardness was found to be D95 in terms of durometer hardness.

The transparent sheet was placed in a mold having a concave surface and a convex surface at 230° C. for compression molding under pressure. Consequently, a concave meniscus lens having a diameter of 20 mm, a central thickness of 2 mm and a center-to-periphery thickness ratio (thickness deviation) of 3 could be obtained.

The transparent sheet obtained in this example has a low dispersion equivalent to the Abbe number (nd=81 to 95) of commercially available fluorophosphate glass alleged to have a low dispersion. The transparent sheet had a surface hardness equal to or higher than the durometer hardness of D92 of the acrylic resin whereas the fluororesin used in the preparation of the optical element of the invention had a durometer hardness of D45.

The transparent sheet could be configured into a lens shape by means of compression molding with the application of heat, so that a low-dispersion aspheric lens having a relatively large aperture could be obtained.

The refractive index and Abbe number obtained at varying mass ratios between the magnesium fluoride fine particles and the organic/inorganic hybrid material are tabulated just below.

TABLE 1

| Organic/inorganic hybrid material vs. magnesium fluoride (ratio by mass) | Refractive index (nd) | Abbe number (vd) |
| --- | --- | --- |
| 70:30 | 1.360 | 85 |
| 80:20 | 1.358 | 82 |
| 90:10 | 1.355 | 80 |

It is found from Table 1 that by increasing or decreasing the ratio by mass between the magnesium fluoride fine particles and the organic/inorganic hybrid material, the refractive index and Abbe number can be varied. It is thus possible to obtain optical materials having diverse optical properties and, hence, extend the range of choices of optical materials in designing optical elements.

EXAMPLE 2

Transparent sheets of 4 mm in thickness were obtained as in Example 1 with the exception that calcium fluoride fine particles having an average particle diameter of 70 nm were used in place of the magnesium fluoride fine particles. The results obtained at varying calcium fluoride contents are tabulated below.

TABLE 2

| Organic/inorganic hybrid material vs. calcium fluoride (ratio by mass) | Refractive index (nd) | Abbe number (vd) |
| --- | --- | --- |
| 70:30 | 1.377 | 83 |
| 80:20 | 1.370 | 81 |
| 90:10 | 1.360 | 79 |

In this case, too, low refractive-index chromatic dispersion characteristics were obtained. As in Example 1, the transparent sheet of 4 mm in thickness was compression molded at 230° C. while it was placed in a mold having a concave surface and a convex surface. As a result, a lens of the same concave meniscus shape could be molded into an optical element.

EXAMPLE 3

Methyltriethoxysilane and methacryloyloxypropyltrimethoxysilane were mixed together at a molar ratio of 8:2 to prepare a solution. Eighteen point nine (18.9) parts by weight equivalent to the alkoxy groups were added to 55.8 parts by weight of that solution, and the solution was stirred at room temperature for 20 hours for poly-condensation of the alkoxy groups. Then, 5.7 parts by weight of hydroxyethyl methacrylate were added and the solution was charged in an evaporator where volatile matter was removed at 40 to 50° C., thereby preparing an inorganic component solution. Then, a photopolymerization initiator Irgacure 149 was added to a methyl methacrylate monomer at 0.5:100 (by mass) to prepare a solution. This solution was mixed with the same weight of the inorganic component solution to obtain an organic/inorganic hybrid material solution.

Fifty (50) parts by weight of this solution were mixed with 50 parts by weight of magnesium fluoride fine particles having an average particle diameter of 50 nm, and the mixture was then defoamed to obtain a transparent viscous fluid.

This transparent viscous fluid was cast into a simple mold of right-angle V shape, where it was irradiated for 5 minutes with ultraviolet radiation from a high-pressure mercury lamp of 200 W for curing by photo-polymerization. By measurement, the refractive index and Abbe number of the cured product were found to be nd=1.429 and vd=70.7.

The aforesaid transparent viscous fluid was supplied onto the concave surface of a concave meniscus glass lens formed of borosilicate optical glass, and a mold of aspheric shape was urged onto that concave surface. The mold was irradiated on the glass lens side for 5 minutes with ultraviolet radiation from a high-pressure mercury lamp of 200 W for curing of the transparent viscous fluid by photopolymerization, followed by removal of the mold.

Thus, an aspheric shape of low dispersion was imparted to the glass lens surface.

The results obtained at varying contents of the magnesium fluoride fine particles in the organic/inorganic hybrid material are tabulated below.

TABLE 3

| Organic/inorganic hybrid material vs. magnesium fluoride (ratio by mass) | Refractive index (nd) | Abbe number (vd) |
| --- | --- | --- |
| 50:50 | 1.429 | 71 |
| 60:40 | 1.440 | 67 |
| 70:30 | 1.450 | 64 |
| 90:10 | 1.470 | 59 |

EXAMPLE 4

Cured products were prepared by ultraviolet irradiation as in Example 3 with the exception that calcium fluoride fine particles having an average particle diameter of 70 nm were used in lieu of the magnesium fluoride fine particles. The optical properties shown in Table 4 were obtained.

TABLE 4

| Organic/inorganic hybrid material vs. calcium fluoride (ratio by mass) | Refractive index (nd) | Abbe number (vd) |
| --- | --- | --- |
| 50:50 | 1.457 | 70 |
| 60:40 | 1.461 | 67 |
| 70:30 | 1.466 | 64 |
| 80:20 | 1.470 | 61 |
| 90:10 | 1.475 | 59 |

According to the present invention as explained above, it is possible to provide an optical element that has a low refractive-index chromatic dispersion as given by an Abbe number of 59 or greater and can be molded or otherwise formed into not only a spherical surface but also an aspheric or other optical surface. With the present invention, it is thus possible to enhance the performance of an optical system and reduce the number of optical elements thereby achieving weight reductions and cost reductions. If the proportion of fine particles having a large Abbe number is regulated, it is then possible to obtain a material having diverse optical properties, so that the degree of freedom in the selection of materials for optical designs can be improved.

What we claim is:

1. An optical element, which is obtained by molding a composition containing a first material that is a fine particle having an Abbe number vd of 80 or greater, having a chromatic dispersion in a visible range, and having a size less than 400 nm, and a second material that is an organic/inorganic hybrid material comprising an organic polymer material having a carbon-carbon bond in a main chain and an inorganic component.

2. The optical element according to claim 1, wherein the first material is a fluoride.

3. The optical element according to claim 1 or 2, wherein the organic polymer material that forms a part of the second material contains a noncrystalline fluororesin.

4. The optical element according to claim 1 or 2, wherein the inorganic component in the second material contains silicon.

5. The optical element according to claim 3, wherein the inorganic component in the second material contains silicon.

6. The optical element according to claim 1, wherein said optical element is any optical element selected from the group consisting of a lens, a prism, an optical filter, a refracting optical element, and a diffracting optical element.

7. An optical element, which is obtained by molding a composition containing a first material that is a fine particle having an Abbe number vd of 80 or greater, having a chromatic dispersion in a visible range, and having a size less than 400 nm, and a second material that is an organic/inorganic hybrid material comprising an organic polymer material having a carbon-carbon bond in a main chain and an inorganic component, wherein the inorganic component in the second material contains silicon, and wherein said first material is dispersed in said second material.

* * * * *